Feb. 23, 1965  M. G. ANDERSON  3,170,662
TIRE BEAD GROMMET AND METHOD OF MAKING SAME
Filed Sept. 29, 1961
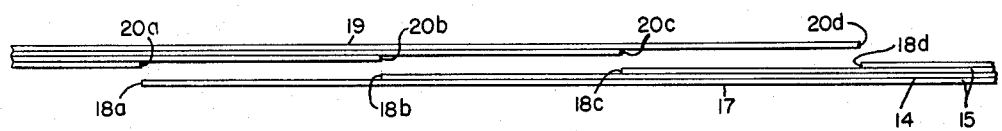
FIG. 3
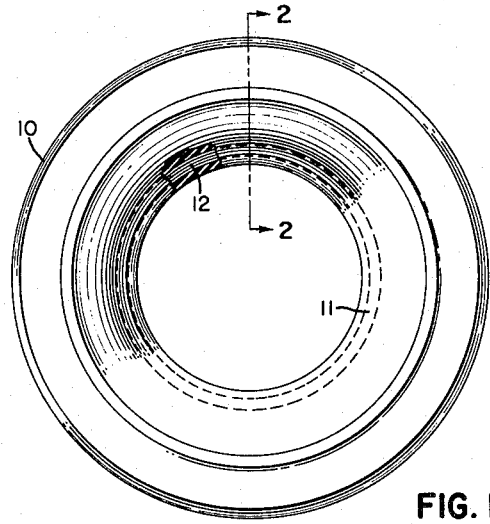
FIG. 1
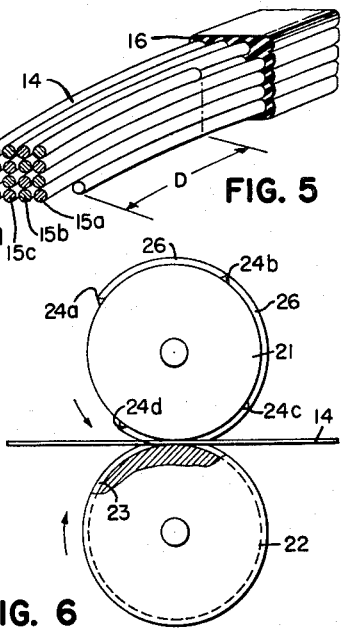
FIG. 5
FIG. 6
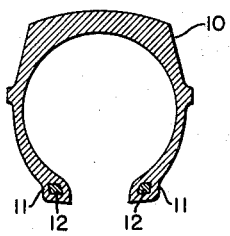
FIG. 2
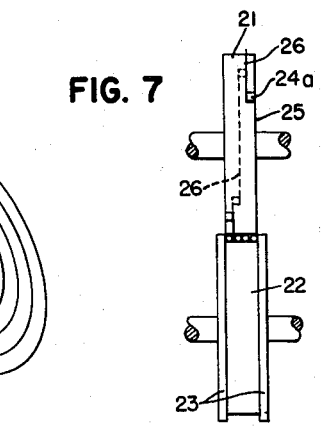
FIG. 7
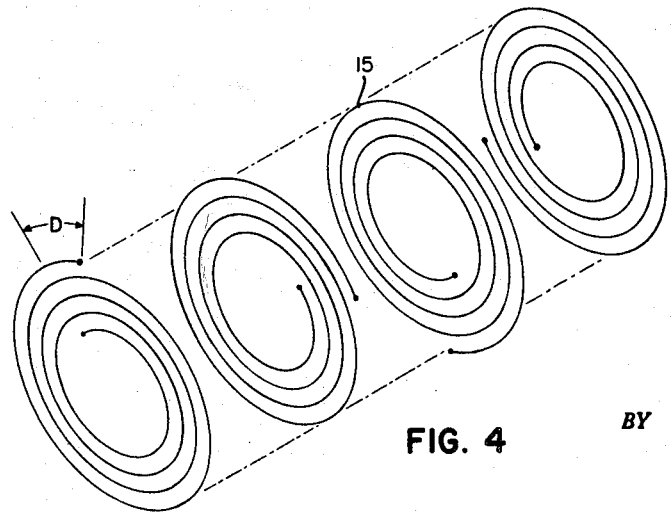
FIG. 4
INVENTOR.
Malcolm G. Anderson
BY
J. B. Holden
ATTORNEY

United States Patent Office 3,170,662
Patented Feb. 23, 1965

3,170,662
TIRE BEAD GROMMET AND METHOD OF MAKING SAME
Malcolm G. Anderson, Hudson, Ohio, assignor to The Goodyear Tire & Rubber Company, Akron, Ohio, a corporation of Ohio
Filed Sept. 29, 1961, Ser. No. 141,679
7 Claims. (Cl. 245—1.5)

This invention relates to an improvement in bead cores or grommets used to reinforce the bead area of pneumatic tires and, particularly, to the construction and method of making such bead cores or grommets.

It is common practice in the manufacture of pneumatic tires to provide bead areas of the tire with substantially inextensible bead cores or grommets usually formed of high carbon steel. The bead grommets are formed by coiling or wrapping a single strand wire but more commonly by coiling or wrapping upon itself a tape or ribbon of several wires which has previously been coated or embedded in rubber by passage through an extruder. The tape or ribbon is severed transversely thereof with the inner and outer ends of the tape overlapped and bound together with a band of friction tape, staples, and the like. The grommet is then usually wrapped with rubberized fabric and provided with a flipper strip of rubberized fabric to form the completed bead for incorporation into the bead portion of the tire.

It is an object of this invention to provide a tire bead ring, core, or grommet of improved durability and quality made of plural strand wire tape or ribbon and a method of making the same.

A further object of the invention is to provide a tire bead ring, core, or grommet, made of multi-wire tape, and a method of making the same, in which the full strength of the grommet is maintained throughout the circumferential extent thereof and which avoids the concentration of wire bulk and strength at a single location in the bead.

A further object of the invention is to provide a tire bead ring, core, or grommet made of wire stranded tape or ribbon, and a method of making the same, in which the inner and outer endings of the wires are concentrically disposed within the circumferential extent of the core or ring or in which the inner and outer endings are so cut that no more than one wire ending exists at any given location in the circumference of the bead.

Other objects and advantages of the present invention will be apparent from the specification and the description of the drawings, in which:

FIG. 1 is a side elevational view of a tire with a portion of the bead area broken away to show the bead core or ring;

FIG. 2 is a cross-sectional view of the tire shown in FIG. 1 taken along the lines 2—2 of FIG. 1;

FIG. 3 is a plan view of the end portions of the wire tape from which the bead core of this invention is made;

FIG. 4 is a schematic, isometric view of the bead core of this invention;

FIG. 5 is an enlarged partial isometric view of the bead core of this invention;

FIG. 6 is a side elevational view of an apparatus for cutting wire tape in the manner according to this invention;

FIG. 7 is a front elevational view of the apparatus shown in FIG. 6.

Referring to the drawings, a pneumatic tire 10 is shown in FIGS. 1 and 2 having bead portions 11 containing a bead core or grommet 12 which, in the construction shown, comprises a plurality of convolutions or turns 13a, 13b, 13c, and 13d of a flat tape or ribbon 14 as shown in FIG. 5. The ribbon or tape 14 comprises four parallel wires 15a, 15b, 15c and 15d surrounded by a rubber body 16. The wires 15a through 15d are formed of a good quality carbon steel of suitable gauge and usually plated with copper or brass to increase the adhesion to the rubber body 16. The tape 14 is coiled upon itself in several convolutions 13 on apparatus which is known in the art and which forms no part of this invention.

Referring to FIGS. 3 through 5, the leading end 17 of the tape 14, which forms the radially inner end of the bead grommet, is cut at longitudinally spaced locations forming ends 18a, 18b, 18c, and 18d, such that the distance between any two adjacent endings 18a through 18d is at least equal to and preferably substantially greater than the width of the tape 14. The trailing or radially outer ending 19 of the tape 14 is cut in a complementary manner to that of the leading end of the tape to form wire endings 20a, 20b, 20c, and 20d which likewise are each spaced apart a distance at least equal to and preferably greater than the width of the tape 14. The maximum angular distance between each inner or outer wire ending is respectively the circumference of the grommet divided by the number of wires in the tape so that in the construction shown, the wire endings would be 90° apart.

As shown in FIGS. 6 and 7 of the drawings, the leading and trailing endings of the wire tape may be continuously cut on the apparatus shown by feeding tape 14 into the nip of two rollers 21 and 22 with the lower roller 22 having flanges 23 between which the tape is positioned. The upper roller 21 is provided with a number of cutters 24 equal to the number of wires in the tape 14. In the construction shown, the roller 21 is provided with four cutters 24 equally spaced circumferentially around the roller 21 and offset axially of the roller 21 a distance equal to the spacing of the individual wires 15 forming the tape 14. As the rollers 22 and 21 revolve in the direction shown by the arrows in FIG. 6 of the drawings, it is seen that the endings 18a and 20a will first be cut by the cutter 24a located adjacent the edge 25 of the roller 21. As the roller 21 is revolved, a circumferentially extending blade 26 severs the rubber body between the endings 18a and 18b and 20a and 20b of the tape. The next cutter 24b severs the second wire of the tape 14 forming endings 18b and 20b until all of the wires have been severed in the manner shown in FIG. 3 of the drawings. The roller 21 is then lifted out of engagement with the tape until a sufficient length of tape passes through the nip of the rolls to form the turns 13b and 13c.

As shown in FIG. 4 of the drawings, each wire 15a through 15b is of equal length and forms a hoop, each of which is offset axially of the grommet. In the form of the invention shown, the circumferential distances between the endings of the wires at the leading and trailing ends of the tape are equal to the circumference of the bead core divided by the number of wires in the tape 14, or the number of hoops formed by the wires, so that in the construction illustrated, the completed bead 12 has, respectively, a single radially inner ending 18a through 18d spaced every 90° of arc in the circumference of the bead and a single radially outer ending 20a through 20d also spaced 90° relative to each other. Also, it is preferred that the inner and outer endings 18a and 20a of the wire 15a overlap each other circumferentially and that the inner and outer endings of each wire 15b through 15d are likewise, respectively, overlapped an equal circumferential distance D of at least 2 inches.

Upon completion of the winding of the grommet 12 on any well known apparatus, it may be built directly into a tire to form the inextensible member of the tire beads or it may be covered with fabric and have bead flippers attached or given any other treatment found desirable before it is built into the tire.

The present invention has been described and illustrated in relation to a core ply grommet made of a tape having four wires therein and with the wire endings spaced apart a circumferential distance equal to the circumference of the bead core divided by the number of wires in the tape. However, it is obvious that the number of plies in the grommet and the number of wires in the tape may be varied. Furthermore, although it is preferred that the inner and outer endings of each of the wires 15a through 15d terminate so that there is an overlap of the inner and outer endings, this invention also contemplates that the inner and outer endings of each wire 15a through 15d terminate, respectively, in the same radial plane.

From the foregoing, it is apparent that this invention eliminates or reduces discontinuities of wire bulk and strength in bead grommets made of a tape or ribbon of wires by an easily manufactured construction to produce bead grommets of improved durability and quality.

While certain representative embodiments and details have been shown for the purpose of illustrating the invention, it will be apparent to those skilled in this art that various changes and modifications may be made therein without departing from the spirit or scope of the invention.

What is claimed is:

1. A tire bead grommet comprising a continuous wire tape having a plurality of wires embedded in rubber and laying in side by side relationship in the same plane, said tape coiled upon itself in a plurality of convolutions, the radially inner and outer convolutions of said tape each having the endings of each wire thereof spaced from any other wire ending a distance circumferentially of the tape which is at least equal to the width of said bead.

2. A tire bead grommet as claimed in claim 1 in which the endings of each wire are spaced a substantially equal circumferential distance from the endings of another wire.

3. A tire bead grommet as claimed in claim 1 in which each wire has a pair of endings which are spaced from the pair of endings of an adjacent wire by a distance approximately the circumference of the grommet divided by the number of wires in the tape.

4. A tire bead grommet comprising a continuous wire tape having a plurality of wires embedded in rubber and laying in side by side relationship in the same plane, said tape coiled upon itself in a plurality of convolutions, the radially inner convolution having a number of endings each ending being spaced from an ending in said inner convolution a substantial distance circumferentially of the bead at least equal to the width of said tape.

5. A tire bead grommet as claimed in claim 4 in which the radially outer convolution of said tape contains a number of endings, each of said endings in said outer convolution being spaced a substantial distance apart circumferentially of the bead at least equal to the width of said bead.

6. A tire bead grommet as claimed in claim 4 in which said wire endings in said inner convolution are spaced apart a substantially equal circumferential distance.

7. A tire bead grommet comprising a plurality of wire hoops embedded in rubber which are offset axially of the bead, each hoop being made of a continuous length of wire with the ends of each hoop terminating in overlapping relationship, the overlapping endings of each hoop being offset with respect to each other an angular distance approximately equal to 360° divided by the number of hoops.

References Cited in the file of this patent
UNITED STATES PATENTS

| | | |
|---|---|---|
| 1,749,899 | Alderfer | Mar. 11, 1930 |
| 1,943,275 | Lerch | Jan. 9, 1934 |
| 2,083,369 | Greene | June 8, 1937 |
| 2,406,270 | Torell et al. | Aug. 20, 1946 |
| 2,822,141 | Robson | Feb. 4, 1958 |
| 2,902,083 | White | Sept. 1, 1959 |
| 2,952,293 | Billingsley | Sept. 13, 1960 |